(12) United States Patent
Janssen

(10) Patent No.: US 7,149,745 B2
(45) Date of Patent: Dec. 12, 2006

(54) METHOD FOR ACCESSING DATABASE TABLE COLUMNS

(75) Inventor: Ocke Janssen, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 262 days.

(21) Appl. No.: 10/135,231

(22) Filed: Apr. 29, 2002

(65) Prior Publication Data

US 2002/0161754 A1 Oct. 31, 2002

(30) Foreign Application Priority Data

Apr. 30, 2001 (EP) .................................. 01110594

(51) Int. Cl.
*G06F 17/00* (2006.01)
*G06F 7/30* (2006.01)

(52) U.S. Cl. .............................. 707/102; 707/4; 707/5; 707/100

(58) Field of Classification Search ............ 707/2–202, 707/1
See application file for complete search history.

(56) References Cited

U.S. PATENT DOCUMENTS

| | | | | |
|---|---|---|---|---|
| 5,652,876 A | * | 7/1997 | Ashe et al. ..................... 707/1 |
| 5,706,213 A | * | 1/1998 | Takakura et al. .............. 702/84 |
| 5,873,086 A | * | 2/1999 | Fujii et al. ..................... 707/10 |
| 5,950,190 A | * | 9/1999 | Yeager et al. .................. 707/3 |
| 6,009,428 A | * | 12/1999 | Kleewein et al. .............. 707/10 |
| 6,061,515 A | * | 5/2000 | Chang et al. ................. 707/100 |
| 6,119,125 A | * | 9/2000 | Gloudeman et al. .... 707/103 R |
| 6,212,513 B1 | * | 4/2001 | Shiratori et al. ............... 707/2 |
| 6,236,997 B1 | * | 5/2001 | Bodamer et al. ............. 707/10 |
| 6,266,673 B1 | * | 7/2001 | Hong et al. ................. 707/102 |
| 6,269,359 B1 | * | 7/2001 | Sekine ......................... 707/10 |
| 6,366,917 B1 | * | 4/2002 | St. John Herbert, III ... 707/100 |
| 6,411,961 B1 | * | 6/2002 | Chen .......................... 707/102 |
| 6,496,833 B1 | * | 12/2002 | Goldberg et al. ........... 707/102 |

(Continued)

FOREIGN PATENT DOCUMENTS

JP 11-296360 10/1999

OTHER PUBLICATIONS

Patent Abstracts of Japan—11296360, Jan. 31, 2000.

(Continued)

*Primary Examiner*—Jean M. Corrielus
*Assistant Examiner*—Anh Ly
(74) *Attorney, Agent, or Firm*—Gunnison, McKay & Hodgson, L.L.P.; Lisa A. Norris

(57) ABSTRACT

The data type of requested data stored in a column of a database table is determined and the data accessed in the data type in which the data is stored. The data type can then be converted to a second data type before outputting the data.

35 Claims, 7 Drawing Sheets

U.S. PATENT DOCUMENTS

| | | |
|---|---|---|
| 6,519,598 B1 * | 2/2003 | Nishizawa et al. ............ 707/10 |
| 6,611,839 B1 * | 8/2003 | Nwabueze ................... 707/101 |
| 6,662,186 B1 * | 12/2003 | Esquibel et al. ............. 707/101 |
| 6,704,726 B1 * | 3/2004 | Amouroux ...................... 707/4 |
| 6,816,865 B1 * | 11/2004 | O'Brien et al. ............. 707/100 |
| 6,820,135 B1 * | 11/2004 | Dingman et al. ............ 707/101 |
| 2001/0037337 A1 * | 11/2001 | Maier et al. ................. 707/101 |
| 2002/0116389 A1 * | 8/2002 | Chen et al. ............. 707/103 R |
| 2002/0161748 A1 * | 10/2002 | Hamel et al. ................... 707/3 |
| 2003/0154216 A1 * | 8/2003 | Arnold et al. ............ 707/104.1 |
| 2003/0225758 A1 * | 12/2003 | Yamasaki ....................... 707/3 |
| 2004/0015515 A1 * | 1/2004 | Beisiegel et al. ....... 707/103 Y |
| 2004/0054699 A1 * | 3/2004 | Bear et al. ................... 707/204 |
| 2004/0243647 A1 * | 12/2004 | Oheda ........................ 707/200 |
| 2004/0257367 A1 * | 12/2004 | Smith et al. ................. 345/441 |

OTHER PUBLICATIONS

XP-002189691—"Online Tutorials".

Simpson, Alan, *"Mastering WordPerfect 6.1 for Windows Special Edition"*, Second Ed., Sybex, 1994, p. 647.

* cited by examiner

|   | 114_1 | 114_2 | 114_3 | 114_4 | 114_x |
|---|-------|-------|-------|-------|-------|
| 112_1 | Surname | First Name | Phone | Fax | ... |
| 112_2 | Miller | Tony | 23427 | 23422 | ... |
| 112_3 | Smith | Mark | 1798 | 1799 | ... |
|  | Wood | James | 2652 | 2655 | ... |
| 112_x | : | : | : | : | : |

|   | 122_1 | 122_2 |   |   |
|---|-------|-------|---|---|
|   | Name | Data type | ... | ... |
|   | Surname | varchar | ... | ... |
|   | First Name | varchar | ... | ... |
|   | Phone | integer | ... | ... |
|   | Fax | integer | ... | ... |
|   | ... | ... | ... | ... |

METHOD FOR ACCESSING DATABASE TABLE COLUMNS

BACKGROUND OF THE INVENTION

1. Field of the Invention

The present invention relates generally to databases, and more particularly, to the access of data stored in columns of relational database tables.

2. Description of Related Art

Relational databases are a common tool for storing, administrating and querying data in an ordered form. Conventionally, relational databases are based on table structures in which data are organized in columns and rows. One row is typically called a data set or a data record, and the columns typically contain different attributes for the individual data sets.

FIG. 1A illustrates a prior art example of a conventional data table. In the present illustration, data relating to an individual are stored in a data table 110 having rows 112_1 through 112_x, and columns 114_1 through 114_x. Each row in data table 110 corresponds to an individual. Each of the columns corresponds to a different attribute for the individual. For example, column 114_1 contains surname data, column 114_2 contains first name data, column 114_3 contains phone number data, column 114_4 contains fax number data, and so on.

Defining relational database tables typically entails defining database table columns as to the attributes of the data stored in each column, with each column containing data of the same data type, such as integer, boolean, varchar, float, double, and other data types. A relational database table, therefore, typically represents the sum of the definition of its columns.

In FIG. 1A, each of the columns 114_1 through 114_4 contain data stored as a designated data type. For example, data can be stored in columns 114_1 and 114_2 as data type "varchar" whereas data in columns 114_3 and 114_4 can be stored as data type "integer".

It should be noted that a "data type" is different from a "data format". The data type defines the manner in which the data is stored, while the data format relates to the manner in which the data is displayed. For example, a date stored as an integer data type can be displayed in the data format of "yy/mm/dd" or "month day year".

The data that together define the properties of a relational database table are sometimes termed the metadata. The metadata define, and to some extent also limit, the capabilities of the relational database. Typically, data types of the data stored in the columns, once defined, cannot be changed easily and, often, cannot be changed at all.

The metadata are typically stored in a metadata table. The metadata table is often located in a memory structure with the associated database table or database application used in administrating the database table; however, the metadata table can be located in other memory structures as well. In some database applications, the metadata can be viewed and defined by a user using a graphical user interface sometimes called a table design view that includes a definition table.

FIG. 1B illustrates one prior art example of a graphical user interface that includes a definition table 120 having data types for data stored in columns of database table 110 of FIG. 1A. In a definition table, typically each row corresponds to a column in the database table defined by the definition table.

For example, in definition table 120, column 122_1 defines the name of each column in database table 110 and column 122_2 defines the data type of the data stored in each column. Thus, the data type of a particular data entry in a database table, such as in database table 110 of FIG. 1A, is not readily observable to a user and can be displayed in a data format that may not be definitive of the underlying data type in which the data is stored.

The contents of database tables can be queried and accessed in a variety of ways. The so-called structured query language, or SQL, is currently a widely used method for querying databases. Using SQL commands, a user can, for example, look for people whose name starts with a "P" and who have a phone number ending with "1".

The data stored in the database tables are typically accessed and managed by programs called database drivers. Database drivers provide the basic functions needed to access database table data, such as the reading and the storing of individual data, columns, rows, etc.

To access the data of individual columns, database drivers typically provide methods that are customized to retrieve data stored according to a certain data type. For each data type, the database driver must offer the user a suitable method for accessing the data, e.g., the data type for which the driver is designed must match the data type of the data stored in the column. The access of column data, therefore, is limited in the sense that the data type of the data stored in the column not only defines the method for retrieval of the data but also defines the data format in which the data is output.

If a user requires data stored in a column of a database to be of a certain data type, different from that in which it is stored, typically, the data type in which the data is stored must first be determined in order to access the data. After the data is accessed, it can be converted to a required data type for use by the user. Frequently, this involves the user manually searching different context menu or tool bar options to identify the data type in which the data is stored in the column and then accessing the data. Further, even if the data type is located it may not accurately reflect the data type of the requested data. This searching process can be time consuming and disruptive to a user. Further, if a program application or component of a program application require the data to be of a different data type from the data type in which the data is stored, typically, the data can not be directly output to the application or component.

SUMMARY OF THE INVENTION

According to the principles of the present invention, there are provided methods, products, and systems for accessing data in a column of a database table.

According to one embodiment of the present invention, a computer-based method for accessing data in a column of a database table includes: receiving a request for data, the data being stored in a column of a database table; determining the data type of the data stored in the column, the data type being of a first data type; accessing the data in the first data type; converting the data from the first data type to a second data type; and outputting the data.

In some embodiments, the method can further include displaying the first data type. Additionally, in some embodiments, the method can further include: selecting an option provided in a context menu, the option providing for display of the first data type; and displaying the first data type. Further, in some embodiments, the method can include: displaying a graphical user interface to a user, the graphical user interface including an option to request display of the first data type; selecting the option to request display of the first data type, the selection inputting a request to display the first data type; and displaying the first data type. Also, in some embodiments, the method can include: determining whether to display the first data type; and upon a determination to display the first data type, displaying the first data type. In some embodiments, the request for data can be input from a user, a program application, and/or a component of a program application. In further embodiments, accessing the data in the first data type can include: a) selecting an access method n to access the data, the access method n being able to access data of a particular data type, the access method n being at least one of a plurality of n access methods able to access data of a particular data type; b) executing the access method n to attempt access of the data; c) determining if the data is successfully accessed by the access method n; d) upon a determination that the data is not successfully accessed by the access method n, incrementing n so that a different access method n is selected, and repeating operations a, b, and c; and e) upon a determination that the data is successfully accessed by the access method n, accessing the data. In some embodiments, the access method n is implemented in a database driver.

According to another embodiment of the present invention, a computer-based method for accessing data in a column of a database table includes: receiving a request for data, the data being stored in a column of a database table; determining the data type of the data stored in the column, the data type being of a first data type; accessing the data in the first data type; determining whether to convert the data from the first data type to a second data type; and outputting the data.

In some embodiments, the method can include: upon a determination to convert the data from the first data type to the second data type, converting the first data type to the second data type, and wherein outputting the data includes outputting the converted data.

According to a further embodiment of the present invention, a computer-based method for accessing data in a column of a database table includes: receiving a request for data in a requested data type, the data being stored in a column of a database table; determining the data type of the data stored in the column, the data type being of a column data type; accessing the data in the column data type; determining if the column data type is the same as the requested data type; upon a determination that the column data type is the same as the requested data type, outputting the data; and upon a determination that the column data type is not the same as the requested data type, converting the column data type to the requested data type, and outputting the data.

In some embodiments, the request for data is input from a user, a program application, or a component of a program application.

According to yet another embodiment of the present invention, a computer-based method for accessing data in a column of a database table includes: receiving a request for data, the data being stored in a column of a database table; determining the data type of the data stored in the column, the data type being of a first data type; determining whether to display the first data type; upon a determination to display the first data type, displaying the first data type; upon a determination not to display the first data type, not displaying the first data type; accessing the data in the first data type; determining whether to convert the data from the first data type to a second data type; upon a determination to convert the data from the first data type to the second data type, converting the data from the first data type to the second data type; upon a determination not to convert the data from the first data type to the second data type, not converting the data; and outputting the data.

In some embodiments, converting the data from the first data type to the second data type includes: determining at least one second data type conversion option, the at least one second data type conversion option indicating a second data type into which the data of the first data type can be converted; displaying the at least one second data type conversion option; selecting a second data type conversion option, the selection of the second data type conversion option indicating selection of a second data type; and converting the data from the first data type to the selected second data type. In some embodiments, determining whether to display the first data type includes: displaying a graphical user interface to a user, the graphical user interface including an option to request display of the first data type, whereupon selecting the option to request display of the first data type is a determination to display the first data type, and further whereupon, not selecting the option to request display of the first data type is a determination not to display the first data type. Also, in some embodiments, determining whether to convert the data from a first data type to a second data type includes: displaying a graphical user interface to a user, the graphical user interface including an option to convert the data from the first data type to a second data type, whereupon selecting the option to convert the data from the first data type to the second data is a determination to convert the data from the first data type to the second data type, and further whereupon, not selecting the option to convert the data from the first data type to the second data type is a determination not to convert the first data type to the second data type. In some embodiments, the graphical user interface includes a context menu.

The present invention also provides computer program products for accessing data in a column of a database table. A computer program product includes a medium configured to store or transport computer-readable instructions or in which computer-readable instructions can be embedded.

According to another embodiment of the present invention, a computer program product for accessing data in a column of a database table has computer-readable instructions for a method that includes: receiving a request for data, the data being stored in a column of a database table; determining the data type of the data stored in the column, the data type being of a first data type; accessing the data in the first data type; converting the data from the first data type to a second data type; and outputting the data.

According to a further embodiment of the present invention, a computer program product for accessing data in a column of a database table has computer-readable instructions for a method including: receiving a request for data, the data being stored in a column of a database table; determining the data type of the data stored in the column, the data type being of a first data type; accessing the data in the first data type; determining whether to convert the data from the first data type to a second data type; and outputting the data.

According to yet another embodiment of the present invention, a computer program product for accessing data in a column of a database table has computer-readable instructions for a method including: receiving a request for data in a requested data type, the data being stored in a column of a database table; determining the data type of the data stored in the column, the data type being of a column data type; accessing the data in the column data type; determining if the column data type is the same as the requested data type; upon a determination that the column data type is the same as the requested data type, outputting the data; and upon a determination that the column data type is not the same as the requested data type, converting the column data type to the requested data type, and outputting the data.

According to yet a further embodiment of the present invention, a computer program product for accessing data in a column of a database table has computer-readable instructions for a method including: receiving a request for data, the data being stored in a column of a database table; determining the data type of the data stored in the column, the data type being of a first data type; determining whether to display the first data type; upon a determination to display the first data type, displaying the first data type; upon a determination not to display the first data type, not displaying the first data type; accessing the data in the first data type; determining whether to convert the data from the first data type to a second data type; upon a determination to convert the data from the first data type to the second data type, converting the data from the first data type to the second data type; upon a determination not to convert the data from the first data type to the second data type, not converting the data; and outputting the data.

The present invention further provides computer systems for accessing data in a column of a database table. The computer systems include: a processor; and a memory coupled to the processor, and having stored therein computer code for one or more methods for accessing data in a column of a database table, wherein upon execution of the computer code on the processor, the method accesses data in a column of a database table.

According to another embodiment of the present invention, a computer system includes: a processor; and a memory coupled to the processor, and having stored therein computer code for a method for accessing data in a column of a database table, wherein upon execution of the computer code on the processor, the method includes: receiving a request for data, the data being stored in a column of a database table; determining the data type of the data stored in the column, the data type being of a first data type; accessing the data in the first data type; converting the data from the first data type to a second data type; and outputting the data.

According to a further embodiment of the present invention, a computer system includes: a processor; and a memory coupled to the processor, and having stored therein computer code for a method for accessing data in a column of a database table, wherein upon execution of the computer code on the processor, the method includes: receiving a request for data, the data being stored in a column of a database table; determining the data type of the data stored in the column, the data type being of a first data type; accessing the data in the first data type; determining whether to convert the data from the first data type to a second data type; and outputting the data.

According to yet another embodiment of the present invention, a computer system includes: a processor; and a memory coupled to the processor, and having stored therein computer code for a method for accessing data in a column of a database table, wherein upon execution of the computer code on the processor, the method includes: receiving a request for data in a requested data type, the data being stored in a column of a database table; determining the data type of the data stored in the column, the data type being of a column data type; accessing the data in the column data type; determining if the column data type is the same as the requested data type; upon a determination that the column data type is the same as the requested data type, outputting the data; and upon a determination that the column data type is not the same as the requested data type, converting the column data type to the requested data type, and outputting the data.

According to yet a further embodiment of the present invention, a computer system includes: a processor; and a memory coupled to the processor, and having stored therein computer code for a method for accessing data in a column of a database table, wherein upon execution of the computer code on the processor, the method includes: receiving a request for data, the data being stored in a column of a database table; determining the data type of the data stored in the column, the data type being of a first data type; determining whether to display the first data type; upon a determination to display the first data type, displaying the first data type; upon a determination not to display the first data type, not displaying the first data type; accessing the data in the first data type; determining whether to convert the data from the first data type to a second data type; upon a determination to convert the data from the first data type to the second data type, converting the data from the first data type to the second data type; upon a determination not to convert the data from the first data type to the second data type, not converting the data; and outputting the data.

BRIEF DESCRIPTION OF THE DRAWINGS

FIG. 1A illustrates a prior art example of a conventional data table;

FIG. 1B illustrates one prior art example of a graphical user interface that includes a definition table 120 having data types for data stored in columns of database table 110 of FIG. 1A;

DETAILED DESCRIPTION

According to various embodiments of the present invention, methods, products and systems are described that determine a data type of data stored in a column of a database table, access the data in the data type in which the data is stored, and then, if desired, can convert the data type in which the data is stored to a second data type before outputting the data. A user does not have to manually locate the data type in which requested data is stored, nor manually locate appropriate access methods for the data or data type conversion programs. Consequently, accessing data in database table columns, particularly where specific data types are required by a requesting user, program application, or program component, is easier and requires less work than the prior art techniques.

Figure 2:
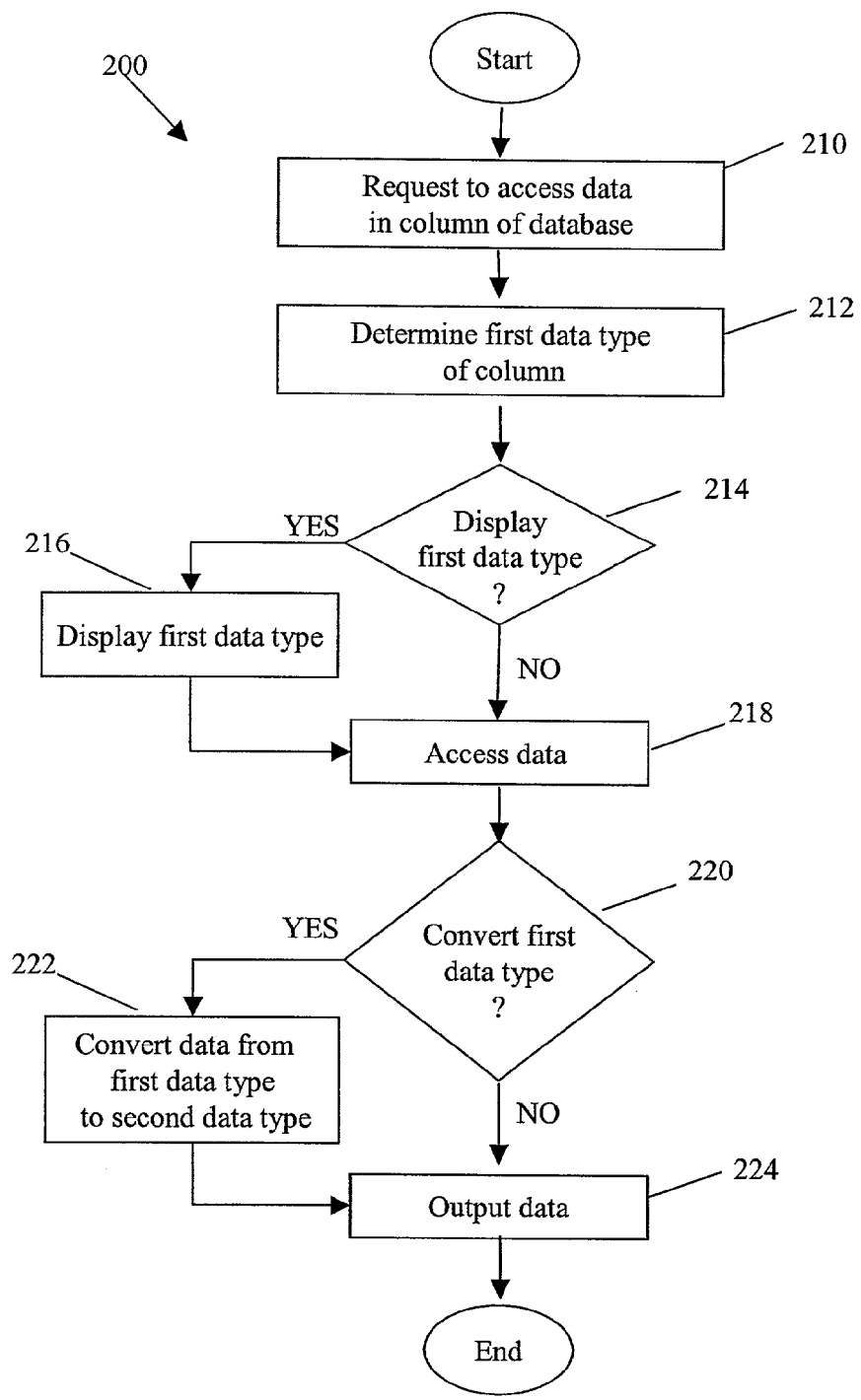
FIG. 2 illustrates a process flow chart of a method for accessing database table column data according to one embodiment of the present invention.

FIG. 2 illustrates a process flow chart of a method for accessing database table column data according to one embodiment of the present invention. Method 200 is described herein as executed on a computer system that permits a user to provide inputs, such as via computer mouse, a computer keyboard, computer digitizing pad, wireless device, or speech recognition system, and to view outputs, such as on a computer display screen. Method 200 can be implemented as a separate program application or as part of another program application, such as a database application.

In operation 210, a request to access data stored in a particular column of a database table is received, such as in response to a query command, from a user, from a program application, or from a component of a program application.

Following the request to access the data, in operation 212 a data type of the data in which the data is stored in the column is determined, e.g., a first data type. The first data type can be determined by reading the column metadata in a metadata table associated with the database table. As earlier described with reference to FIG. 1B, the metadata table can be stored in a variety of locations, but is typically stored in a memory structure associated with the database table.

When the first data type is determined, in operation 214 a determination is made as to whether to display the first data type. The user can effect a request to display the first data type by performing a predefined operation, such as selecting a request to "display data type".

Figure 4:
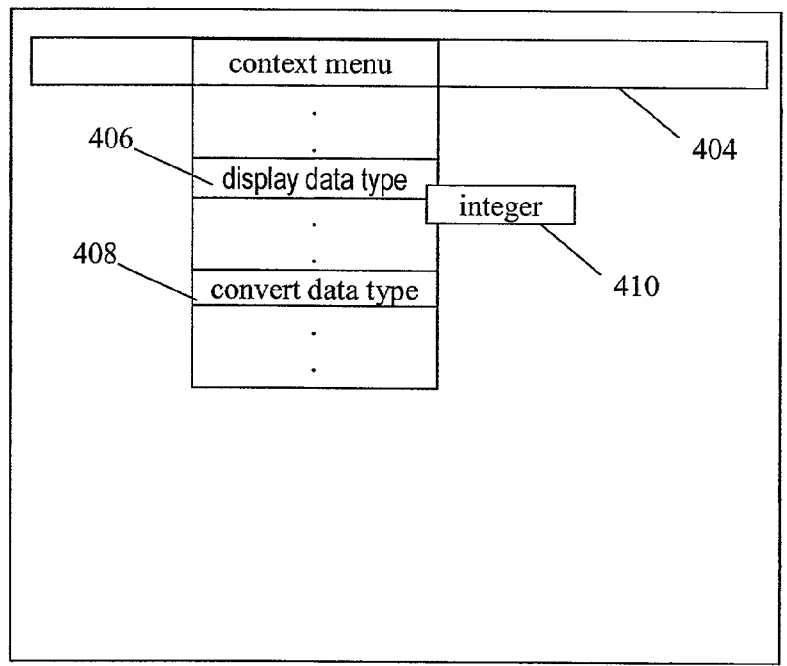
FIG. 4 illustrates an example of a context menu graphical user interface that can be presented to a user in implementing method 200 according to one embodiment of the present invention.

FIG. 4 illustrates an example of a context menu graphical user interface that can be presented to a user in implementing method 200 according to one embodiment of the present invention. In display screen 402 of FIG. 4, selection of option 406 "display data type" in context menu 404 effects a request to display the first data type to the user.

Referring back to FIG. 2, if the user requests display of the data type, at operation 216 the data type is displayed, such as on a computer display screen, and the process proceeds to operation 218. For example, as illustrated in FIG. 4, a pop-up window 410 can be displayed presenting the data type, such as "integer".

Alternatively, if the user does not request display of the data type, such as by the user not selecting option 406 "display data type" in the context menu 404, operation 216 is not performed, and method 200 proceeds from operation 214 to operation 218.

In operation 218, the data is accessed in the data type in which it is stored in the column. Recall that for each data type, a corresponding access method is used to access the data of that data type.

Data access in a database table is typically carried out by reading the data out from the storage location where the data are stored into variables which are suitable, according to their data type definition, to store the read out data values. For such readout operations there exist well-known methods that are specific to the data type to be read out. For example, a boolean data type can be accessed using a method called "getbool", and an integer data type can be accessed using a method called "getint". These methods and their usage are well-known to those of skill in the art and are not further detailed herein.

These access methods, such as readout methods, are typically provided in database drivers that are components of commercially available database management software. Thus, in the present example, the data can be accessed using a database driver having methods that can access the first data type.

After the data is accessed, in operation 220 a determination is made as to whether to convert the data type in which the data is stored to another data type, e.g., a second data type. A request to convert the data type in which the data is stored can be effected by the user performing a predefined operation, such as selecting an option to convert the data type.

For example, referring back to FIG. 4, selection of option 408 "convert data type" in the context menu 404, effects a determination to convert the first data type to a second data type, e.g., effects a request to convert the first data type to a second data type.

Returning again to FIG. 2, if data type conversion is requested, in operation 222 the data type in which the data is stored in the column is converted to a second data type. For example, the first data type of the data is converted to a second data type. The converted data is then output in operation 224.

Data type conversion is accomplished according to standard procedures well-known to those of skill in the art and not further described in detail herein. A particular data type conversion implementation can depend upon the particular first data type to be converted from and the particular second data type into which the first data type is to be converted. For example, data type conversions such as the conversion of integer values into strings or of variable types from one data type into another are well-known to a programmer.

Output of the data in operation 224 can be in any of a wide variety of output forms. For example, operation 224 can output the data as a display to a screen, such as a display of some query result, or as output to another program or program component, such as a spreadsheet program into which the output is to be imported. It can also be a query result table that can again be subject to a database query or the like.

Thus, the manner in which the data is stored in the column of a database table is not changed. Rather, what is changed is the manner of accessing the data.

Alternatively, if data type conversion is not requested, operation 216 is not performed, and the unconverted data accessed in operation 218 is then output in operation 224. For example, in FIG. 4, if the user did not select option 408 "convert data type", the data would not be converted.

In some instances, when converting from a first data type to a second data type, it can be desirable for the user to have the ability to select from among different second data types. However, it may not be plausible or efficient to convert between some data types. Thus, in another embodiment of the present invention, a user can select among second data types that are determined to be plausible or efficient, or viewed another way, that are not determined to be implausible or inefficient.

Figure 3:
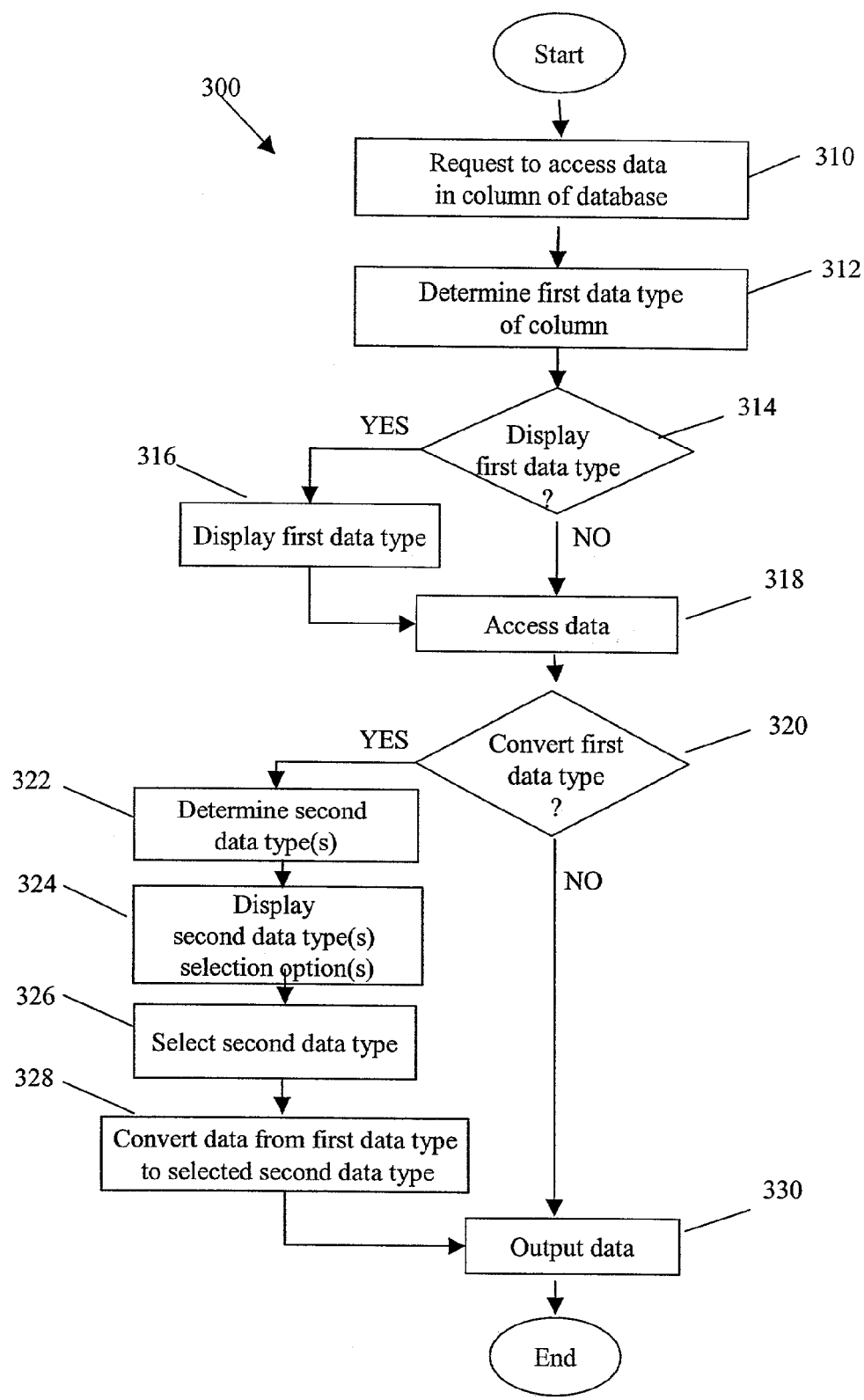
FIG. 3 illustrates a process flow chart of a method for accessing database table column data where a user can select a second data type according to one embodiment of the present invention.

FIG. 3 illustrates a process flow chart of a method for accessing database table column data where a user can select a second data type according to one embodiment of the present invention. In method 300, operations 310 through 318 are performed similar to operations 210 through 218 of method 200. Thus, the description of operations 210 through 218 are incorporated herein by reference for operations 310 through 318, respectively.

After the data is accessed, in operation 320 a determination is made whether to convert the data type of the data in which it is stored in the column, e.g., the first data type, to another data type, e.g., a second data type. A request to convert the data type can be effected by the user performing a predefined operation, such as selecting an option to convert the data type.

Figure 5:
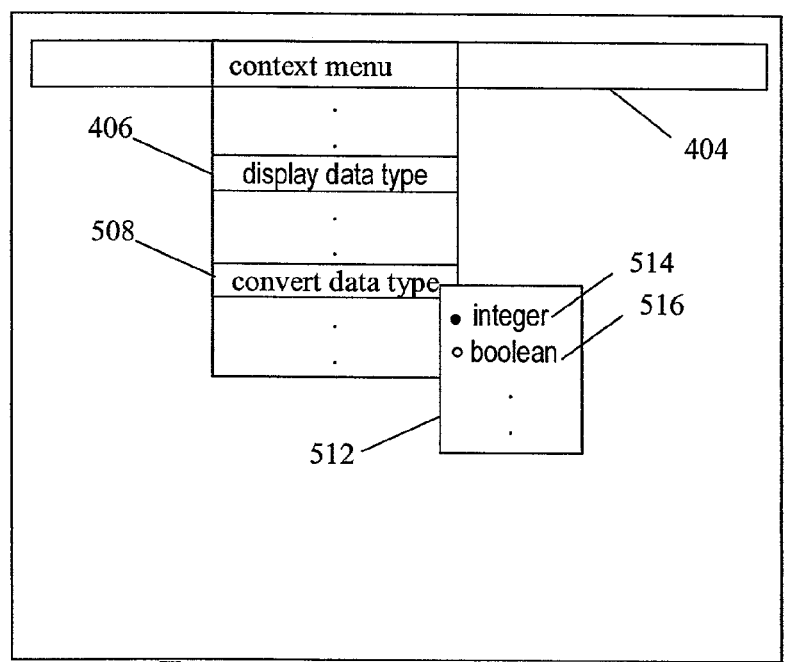
FIG. 5 illustrates an example of a context menu graphical user interface that can be presented to a user in implementing method 300 according to one embodiment of the present invention.

FIG. 5 illustrates an example of a context menu graphical user interface that can be presented to a user in implementing method 300 according to one embodiment of the present invention. In display screen 502 of FIG. 5, in context menu 404, selection of option 508 "convert data type" effects a determination, e.g., a request, to convert the first data type to a second data type as further described in operations 322 through 328.

Referring back to FIG. 3, if a conversion request is made by the user, in operation 322 it is determined which second data types should be presented as second data type conversion options to the user. This determination can be implemented in a variety of ways, such as by looking up suitable conversion options in a look-up table. The look-up table can be stored in a variety of memory locations, such as with the database application.

This determination is a kind of plausibility check. For example, it usually does not make sense to convert a double precision floating point variable data type into a Boolean data type. Thus, in determining the selectable second data types, those data types which seem to be useful or meaningful for a given first data type are checked, for example, on a look-up table.

After determining the second data type conversion option(s), in operation 324 the second data type conversion options are displayed to the user, for example, as selectable second data type conversion options. Referring again to FIG. 5, selection of option 508 "convert data type" effects the display of a pop-up window 512 having second data type conversion options 514 and 516 that are selectable by the user.

Returning to FIG. 3, in operation 326 a second data type conversion option is selected from among the displayed second data type conversion options. Selection of a second data type conversion option can be accomplished by any predetermined input operation, such as by positioning the cursor on the desired second data type conversion option and clicking the left button on a computer mouse. For example, referring again to FIG. 5, option 514 "integer" is selected.

Returning again to FIG. 3, following selection of the second data type conversion option, in operation 328, the first data type of the data stored in the column is converted to the selected second data type. Data type conversion is accomplished as earlier described with reference to operation 222 of method 200 and hereby incorporated by reference. The converted data is then output in operation 330.

Alternatively, if data type conversion is not requested, operations 322 through 328 are not performed, and the unconverted data accessed in operation 318 is then output in operation 330. For example, in FIG. 5, if the user did not select option 508 "convert data type", the data would not be converted.

It can be appreciated by those of skill in the art that the implementations of methods 200 and 300 as illustrated in conjunction with FIGS. 4 and 5 can be accomplished in a wide variety of ways using a multitude of graphical user interfaces and that the embodiments presented herein are merely intended to illustrate the principles of the present invention.

In some instances, it can occur that the column properties with respect to the data type used for storing the column data are internally different than they appear to be externally. For example, data in a column can externally appear to be of the Boolean data type, but internally, a Boolean "true" can be stored as integer value "0", while a Boolean "false" can be stored internally as an integer value "−1". In this example, it is not possible to access the data in the column by a method suitable for the data type "Boolean". Rather, it is required to access the data by a method suitable for accessing an integer data type.

Such inconsistencies can occur in any database program. The inconsistencies can have been introduced due to some kind of lazy design, such as "bugs", or can have been implemented for some reason. In such instances, however, a user cannot determine the data type of the data in the column by reading the metadata, or at least the user cannot be sure that the data type listed in the metadata is actually the data type of the data stored in the column.

Thus, another embodiment of the present invention provides a method for determining a suitable access method to the data stored in a column prior to providing for conversion from the data type in which the data is stored to another data type.

Figure 6:
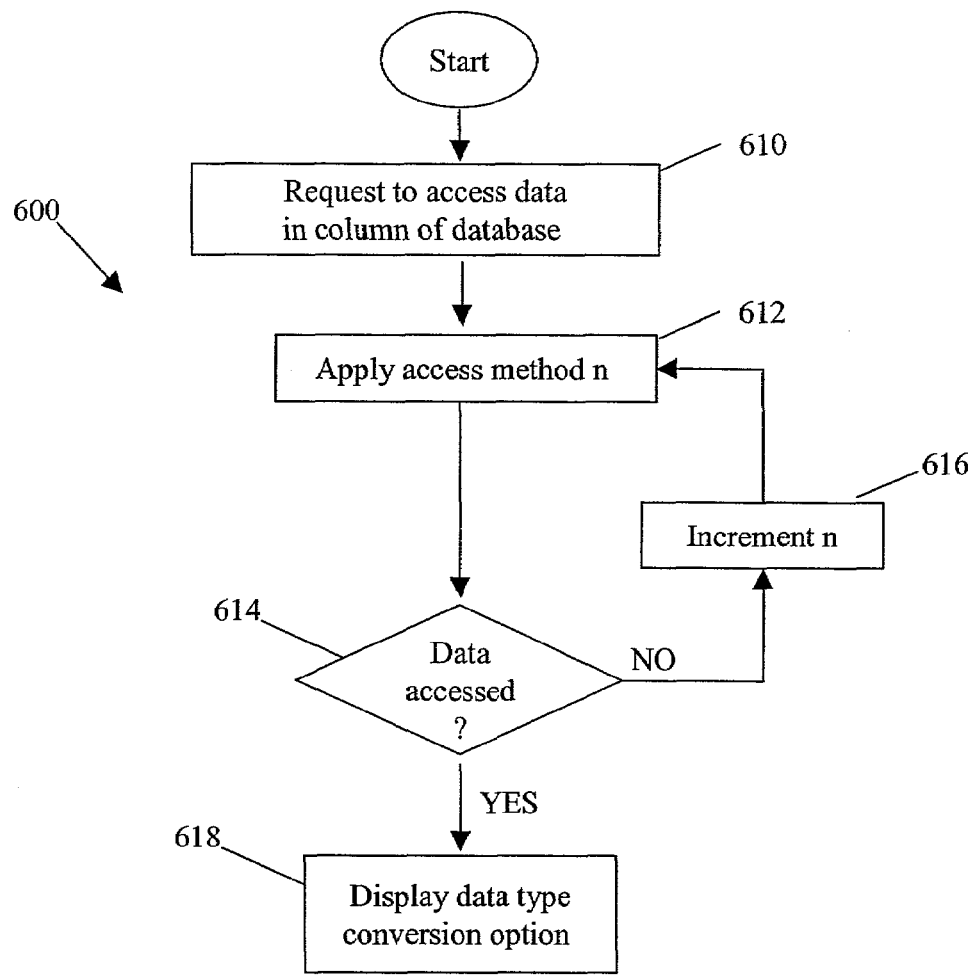
FIG. 6 illustrates a process flow chart of a method for accessing database table column data where an access method is determined prior to providing for data type conversion according to one embodiment of the present invention.

FIG. 6 illustrates a process flow chart of a method for accessing database table column data where an access method to the data is determined prior to providing for data type conversion according to one embodiment of the present invention.

In operation 610, a request to access data stored in a particular column of a database table is received, such as in response to a query command, from a user, from a program application, or from a component of a program application.

Following the request to access the data, in operation 612 a first access method is performed in an attempt to obtain access to the data in the column. For example, a first database driver having a first access method n can be used, e.g., the access method n performed, to access the data in the column.

After the first access method n is performed, in operation 614 it is determined whether the first access method n has successfully accessed the data. For example, successful access of the data can be determined when a meaningful output is delivered, such as by checking the content of the data that was read out.

If the access method n of operation 614 did not successfully access the data, then in operation 616, n is incremented, and the next available access method is selected and operations 612 though 616 are repeated until the data is successfully accessed. For example, if a first database driver having a first access method delivers read out data that makes no sense or an error message occurs, it is determined that the data was not successfully accessed and the next database driver having another access method is selected, such as a second database driver.

Incrementing can be accomplished by any of a wide variety of techniques well-known to those of skill in the art and is not further described herein. To avoid continuously repeating the incremental selection of database drivers when none successfully access the data, the incrementing operation can further provide an option to exit method 600.

If the data is successfully accessed in operation 614, then the data type of the data stored in the column must be in conformity with the selected access method n, and therefore, the data type of the data stored in the column has been determined. For example, if the first database driver includes a first access method n for accessing the first data type, then the data type of the data stored in the column is the first data type. The correlation of the data type to the database driver and/or access method can be made by any technique, such as by a look-up table.

Following determination of the data type of the data stored in the column, e.g., the first data type, in operation 618 method 600 can then proceed in the manner as earlier described with reference to operations 214 through 224 of method 200 or operations 314 through 330 of method 300 which are herein respectively incorporated by reference.

The various embodiments earlier described herein are particularly useful in instances when a user wishes data output in a particular data type. However, it can also be that the request comes from an application program or from a program component that requires data to be of a particular data type that is not the same as the data type in which the data is stored in the column of the database. Most database applications or other program applications that utilize database tables and/or a supporting database application are not typically configured to respond to queries intended for display to a user. Thus, the present invention provides a method for accessing data in a column of a database in which the data is of a requested data type, and then, if the data type of the data in which the data is stored is not the same as the requested data type, the data type of the data stored in the column is converted to the requested data type and output.

Figure 7:
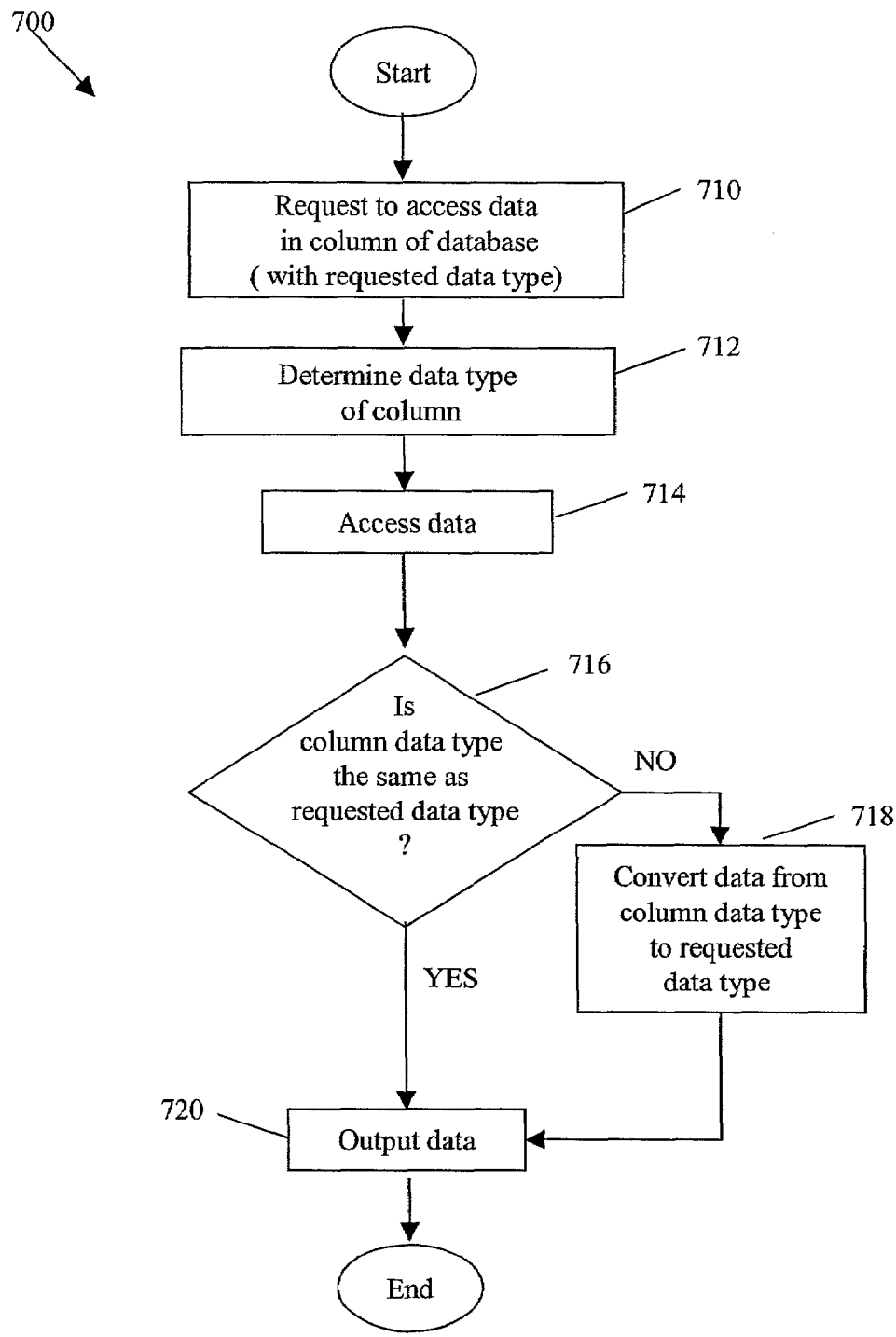
FIG. 7 illustrates a process flow chart of a method for accessing database table column data where an access method is determined prior to providing for data type conversion according to one embodiment of the present invention.

FIG. 7 illustrates a process flow chart of a method for accessing database table column data where an access method is determined prior to providing for data type conversion according to one embodiment of the present invention. According to method 700, in operation 710 access data stored in a particular column of a database table is requested, where the data is requested in a requested data type, such as in response to a query command from a program application or from a component of a program application.

Following the request to access the data, in operation 712 the data type of the data stored in the column is determined, e.g., the column data type. Determination of the column data type can be performed as earlier described with reference to methods 200, 300, and 600 and which are herein respectively incorporated by reference.

After the data type of the data stored in the column is determined, in operation 714 the data is accessed based upon the determined data type. For example, the column data type is determined and the data is accessed based upon the determined column data type. Access of the data can be performed as earlier described with reference to methods 200, 300, and 600 which are herein respectively incorporated by reference.

In operation 716, it is determined whether the requested data type is the same as the determined data type of the data stored in the column. This determination can be performed by any variety of comparison techniques well-known to those of skill in the art, such as matching. For example, it is determined whether the requested data type matches the column data type.

If the requested data type and the column data type are the same, the unconverted data is output in operation 720.

Alternatively, if it is determined that the requested data type is not the same as the column data type, then in operation 718 the column data type is converted to the requested data type. Data type conversion can be performed as earlier described with reference to operation 222 of method 200 which is herein incorporated by reference. The converted data is then output in operation 720.

Figure 8:
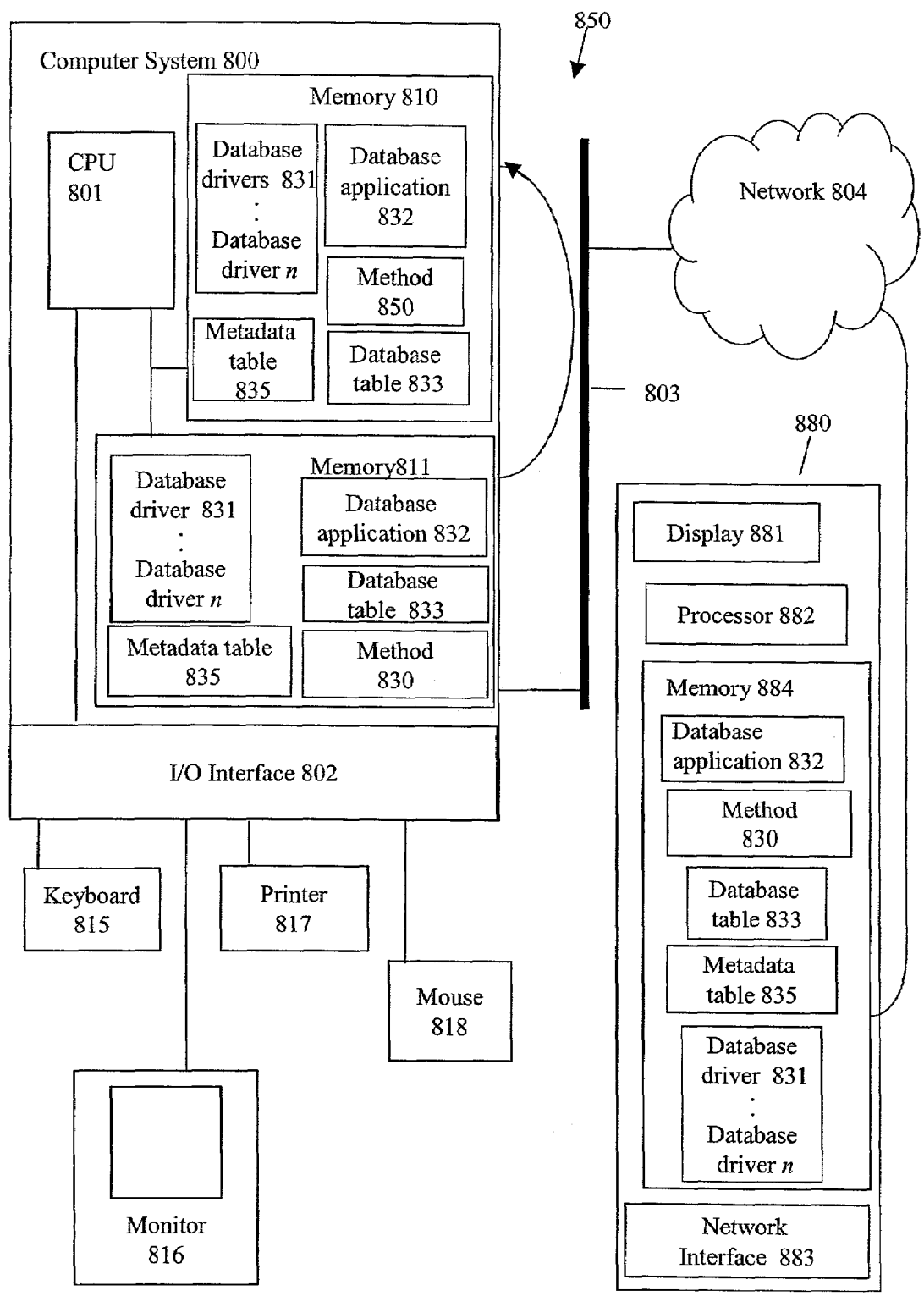
FIG. 8 is a block diagram of a computer system in which the present invention can be implemented.

The present invention can be implemented in a variety of ways, including as a stand-alone system, such as a personal computer or workstation, as illustrated schematically in FIG. 8 by computer system 800. The present invention can also be implemented in a client-server configuration 850 that is also illustrated in FIG. 8. Database table 833, as well as database application 832, metadata table 835, database driver(s) 831, and associated look-up tables (not shown), can be stored in memory 811 on computer system 800 or in memory 884 on server computer 880. The database table 833 can be displayed on a display screen of client device 800, such as display monitor 816, while some or all operations of methods 200, 300, 600, and 700, herein designated as method 830, are carried out on a server computer 880 accessible by the client device 800 over a data network 804, such as the Internet, using a browser application or the like. Method 830 can include one, some, or all of methods 200, 300, 600, and 700 as described herein.

Herein, a computer program product comprises a medium configured to store or transport computer-readable instructions, such as program code, for method 830, or in which computer-readable instructions for method 830 are stored. Some examples of computer program products are CD-ROM discs, ROM cards, floppy discs, magnetic tapes, computer hard drives, servers on a network and signals transmitted over a network representing computer-readable instructions.

Further herein, a means for performing a particular function is accomplished using the appropriate computer-readable instructions and the related hardware necessary to performing the function.

As illustrated in FIG. 8, this storage medium can belong to computer system 800 itself. However, the storage medium also can be removed from computer system 800. For example, method 830 can be stored in memory 884 that is physically located in a location different from processor 801, as well as in a location different from database application 832, metadata table 835, database driver(s) 831, and associated look-up tables (not shown). The only requirement is that processor 801 is coupled to the memory containing method 830 and that method 830 have access to database application 832, metadata table 835, database driver(s) 831, and associated look-up tables (not shown) as needed. This could be accomplished in a client-server system 850, e.g., system 800 is the client and system 880 is the server, or alternatively via a connection to another computer via modems and analog lines, or digital interfaces and a digital carrier line.

For example, memory 884 could be in a World Wide Web portal, while display unit 816 and processor 801 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 800, in one embodiment, can be a portable computer, a workstation, a two-way pager, a cellular telephone, a digital wireless telephone, a personal digital assistant, a server computer, an Internet appliance, or any other device that includes the components shown and that can execute method 830. Similarly, in another embodiment, computer system 800 can be comprised of multiple different computers, wireless devices, cellular telephones, digital telephones, two-way pagers, or personal digital assistants, server computers, or any desired combination of these devices that are interconnected to perform, method 830 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 830 can be implemented in a wide variety of computer system configurations. In addition, method 830 could be stored as different modules in memories of different devices. For example, method 830 could initially be stored in a server computer 880, and then as necessary, a module of method 830 could be transferred to a client device 800 and executed on client device 800. Consequently, part of method 830 would be executed on the server processor 882, and another part of method 830 would be executed on processor 801 of client device 800.

Further, in view of this disclosure, those of skill in the art can implement the invention in a wide-variety of physical hardware configurations using an operating system and computer programming language of interest to the user. For example, FIG. 8 shows input devices 815 and 818, but other input devices, such as digitizing pads, wireless devices, speech recognition software, and/or hardware could be used to input the selections and data for method 830.

In yet another embodiment, method 830 is stored in memory 884 of system 880. Stored method 830 is transferred, over network 804 to memory 811 in system 800. In this embodiment, network interface 883 and I/O interface 802 would include analog modems, digital modems, or a network interface card. If modems are used, network 804 includes a communications network, and method 830 is downloaded via the communications network.

Method 830 can be implemented in a computer program, such as database application 832, including comprehensive office application STAROFFICE that is available from Sun Microsystems, Inc. of Palo Alto, Calif. (STAROFFICE is a trademark of Sun Microsystems.) Such a computer program can be stored on any common data carrier like, for example, a floppy disk or a compact disc (CD), as well as on any common computer system's storage facilities like hard disks. Therefore, an embodiment of the present invention also relates to a data carrier for storing a computer program for carrying out the inventive method. Another embodiment of the present invention relates to a method for using a computer system for carrying out the presented inventive method. Yet another embodiment of the present invention relates to a computer system with a storage medium on which a computer program for carrying out the presented inventive method is stored. One of skill in the art can recognize that in some embodiments many of the operations of method 830 can occur automatically without user input while others can occur automatically as a result of user input. Further, while the invention has been particularly shown with reference to an embodiment thereof, it can be understood by those skilled in the art that various other changes in the form and details can be made therein without departing from the spirit and scope of the invention.

I claim:

1. A computer-based method for accessing data in a column of a database table, the method comprising:
  receiving a request for data, the requested data being stored in the column of the database table;
  determining a data type of the requested data stored in the column, the data type being of a first data type;
  accessing the requested data in the first data type,
  wherein accessing the requested data in the first data type further comprises:
    a) selecting an access method to access the requested data, the access method being able to access data of a particular data type, the access method being at least one of a plurality of access methods able to access data of a particular data type, and the access method being implemented in a data base driver,
    b) executing the access method to attempt access of the requested data,
    c) determining if the requested data is successfully accessed by the access method,
    d) upon a determination that the requested data is not successfully accessed by the access method, incrementing to a next access method in said plurality of access methods so that a different access method is selected, and
    repeating operations a, b, and c; and
    e) upon a determination that the requested data is successfully accessed by the access method, accessing the requested data;
  converting the requested data from the first data type to a second data type based upon a single user input of a selection of an option to convert the requested data from the first data type to a second data type; and
  outputting the requested data.

2. The method of claim 1, further comprising:
  displaying the first data type.

3. The method of claim 1, wherein the option is provided in a context menu.

4. The method of claim 1, further comprising:
  displaying a graphical user interface to a user, the graphical user interface including an option to request display of the first data type;
  selecting the option to request display of the first data type, the selection inputting a request to display the first data type; and
  displaying the first data type.

5. The method of claim 1, further comprising:
  determining whether to display the first data type; and
  upon a determination to display the first data type, displaying the first data type.

6. The method of claim 1, wherein the request for data is input from at least one of a user, a program application, and a component of a program application.

7. A computer-based method for accessing data in a column of a database table, the method comprising:
  receiving a request for data, the requested data being stored in the column of the database table;
  determining a data type of the requested data stored in the column, the data type being of a first data type;
  accessing the requested data in the first data type,
  wherein accessing the requested data in the first data type further comprises:
    a) selecting an access method to access the requested data, the access method being able to access data of a particular data type, the access method being at least one of a plurality of access methods able to access data of a particular data type, and the access method being implemented in a data base driver,
    b) executing the access method to attempt access of the requested data,
    c) determining if the requested data is successfully accessed by the access method, d) upon a determination that the requested data is not successfully accessed by the access method, incrementing to a next access method in said plurality of access methods so that a different access method is selected, and repeating operations a, b, and c; and e) upon a determination that the requested data is successfully accessed by the access method, accessing the requested data;

determining whether to convert the requested data from the first data type to a second data type based upon a single user input of a selection of an option to convert the requested data from the first data type to the second data type;

upon a determination to convert the requested data from the first data type to the second data type, converting the requested data from the first data type to the second data type; and outputting the requested data.

8. A computer-based method for accessing data in a column of a database table, the method comprising:

receiving a request for data in a requested data type, the requested data being stored in the column of the database table;

determining a data type of the requested data stored in the column, the data type being of a column data type;

accessing the requested data in the column data type, wherein accessing the requested data in the column data type further comprises:

a) selecting an access method to access the requested data, the access method being able to access data of a particular data type, the access method being at least one of a plurality of access methods able to access data of a particular data type, and the access method being implemented in a data base driver, b) executing the access method to attempt access of the requested data, c) determining if the requested data is successfully accessed by the access method, d) upon a determination that the requested data is not successfully accessed by the access method, incrementing to a next access method in said plurality of access methods so that a different access method is selected, and repeating operations a, b, c; and e) upon a determination that the requested data is successfully accessed by the access method, accessing the requested data;

determining if the column data type is the same as the requested data type;

upon a determination that the column type is the same as the requested data type, outputting the requested data; and upon a determination that the column data type is not the same as the requested data type, converting the requested data from the column data type to the requested data type, and outputting the requested data.

9. The method of claim 8 wherein the request for data is input from at least one of a user, a program application, and a component of a program application.

10. A computer-based method for accessing data in a column of a database table, the method comprising:

receiving a request for data, the requested data being stored in the column of the database table;

determining a data type of the requested data stored in the column, the data type being of a first data type;

determining whether to display the first data type;

upon a determination to display the first data type, displaying the first data type;

upon a determination not to display the first data type, not displaying the first data type;

accessing the requested data in the first data type, wherein accessing the requested data in the first data type further comprises:

a) selecting an access method to access the requested data, the access method being able to access data of a particular data type, the access method being at least one of a plurality of access methods able to access data of a particular data type, and the access method being implemented in a data base driver, b) executing the access method to attempt access of the requested data, c) determining if the requested data is successfully accessed by the access method, d) upon a determination that the requested data is not successfully accessed by the access method, incrementing to a next access method in said plurality of access methods so that a different access method is selected, and repeating operations a, b, and c; and e) upon a determination that the requested data is successfully accessed by the access method, accessing the requested data;

determining whether to convert the requested data from the first data type to a second data type based upon a single user input selection of an option to convert the requested data from the first data type to the second data type;

upon a determination to convert the requested data from the first data type to the second data type, converting the requested data from the first data type to the second data type;

upon a determination not to convert the requested data from the first data type to the second data type, not converting the requested data; and outputting the requested data.

11. The method of claim 10, wherein converting the requested data from the first data type to the second data type further comprises:

determining at least one second data type conversion option, the at least one second data type conversion option indicating a second data type into which the requested data of the first data type can be converted;

displaying the at least one second data type conversion option;

selecting a second data type conversion option, the selection of the second data type conversion option indicating selection of a second data type; and converting the requested data from the first data type to the selected second data type.

12. The method of claim 10, wherein determining whether to display the first data type further comprises:

displaying a graphical user interface to a user, the graphical user interface including an option to request display of the first data type, whereupon selecting the option to request display of the first data type is a determination to display the first data type, and further whereupon, not selecting the option to request display of the first data type is determination not to display the first data type.

13. The method of claim 10, wherein determining whether to convert the requested data from a first data type to a second data type further comprises:
displaying a graphical user interface to a user, the graphical user interface including the option to convert the requested data from the first data type to a second data type,
whereupon selecting the option to convert the requested data from the first data type to the second data type is a determination to convert the requested data from the first data type to the second data type,
and further whereupon, not selecting the option to convert the requested data from the first data type to the second data type is a determination not to convert the requested data from the first data type to the second data type.

14. The method of claim 13, wherein the graphical user interface further comprises:
a context menu.

15. A computer program product for accessing data in a column of a database table, the computer program product comprising computer-readable instructions for a method comprising:
receiving a request for data, the requested data being stored in the column of the database table;
determining a data type of the requested data stored in the column, the data type being of a first data type;
accessing the requested data in the first data type,
wherein accessing the requested data in the first data type further comprises:
a) selecting an access methods to access the requested data, the access method being able to access data of a particular data type, the access method being at least one of a plurality of access methods able to access data of a particular data type, and the access method being implemented in a data base driver,
b) executing the access method to attempt access of the requested data,
c) determining if the requested data is successfully accessed by the access method,
d) upon a determination that the requested data is not successfully accessed by the access method, incrementing to a next access method in said plurality of access methods so that a different access method is selected, and
repeating operations a, b, and c; and
e) upon a determination that the requested data is successfully accessed by the access method, accessing the requested data;
converting the requested data from the first data type to a second data type based upon a single user input of a selection of an option to convert the requested data from the first data type to the second data type; and
outputting the requested data.

16. The computer program product of claim 15, further comprising:
displaying the first data type.

17. The computer program product of claim 15, wherein the option is provided in a context menu.

18. The computer program product of claim 15, further comprising:
displaying a graphical user interface to a user, the graphical user interface including an option to request display of the first data type;
selecting the option to request display of the first data type, the selection inputting a request to display the first data type; and
displaying the first data type.

19. The computer program product of claim 15, further comprising:
determining whether to display the first data type; and
upon a determination to display the first data type, displaying the first data type.

20. The computer program product of claim 15, wherein the request for data is input from at least one of a user, a program application, and a component of a program application.

21. A computer program product for accessing data in a column of a database table the computer program product comprising computer-readable instructions for a method comprising:
receiving a request for data, the requested data being stored in the column of the database table;
determining a data type of the requested data stored in the column, the data type being of a first data type;
accessing the requested data in the first data type,
wherein accessing the requested data in the first data type further comprises:
a) selecting an access method to access the requested data, the access method being able to access data of a particular data type, the access method being at least one of a plurality of access methods able to access data of a particular data type, and the access method being implemented in a data base driver,
b) executing the access method to attempt access of the requested data,
c) determining if the requested data is successfully accessed by the access method,
d) upon a determination that the requested data is not successfully accessed by the access method, incrementing to a next access method in said plurality of access methods so that a different access method is selected, and
repeating operations a, b, and c; and
e) upon a determination that the requested data is successfully accessed by the access method, accessing the requested data;
determining whether to convert the requested data from the first data type to a second data type based upon a single user input of a selection of an option to convert the requested data from the first data type to a second data type;
upon a determination to convert the requested data from the first data type to the second data type, converting the requested data from the first data type to the second data type; and
outputting the requested data.

22. A computer program product for accessing data in a column of a database table, the computer program product comprising computer-readable instructions for a method comprising:
receiving a request for data in a requested data type, the requested data being stored in the column of the database table;
determining a data type of the requested data stored in the column, the data type being of a column data type;
accessing the requested data in the column data type,
wherein accessing the requested data in the column data type further comprises:
a) selecting an access method to access the requested data, the access method being able to access data of a particular data type, the access method being at least one of a plurality of access methods able to access data of a particular data type, and the access method being implemented in a data base driver, b) executing the access method to attempt access of the requested data, c) determining if the requested data is successfully accessed by the access method, d) upon a determination that the requested data is not successfully accessed by the access method, incrementing to a next access method in said plurality of access methods so that a different access method is selected, and repeating operations a, b, and c; and e) upon a determination that the requested data is successfully accessed by the access method, accessing the requested data;

determining if the column data type is the same as the requested data type;

upon a determination that the column data type is the same as the requested data type, outputting the requested data; and upon a determination that the column data type is not the same as the requested data type, converting the requested data from the column data type to the requested data type, and outputting the requested data.

23. The computer program product of claim 22, wherein the request for data is input from at least one of a user, a program application, and a component of a program application.

24. A computer program product for accessing data in a column of a database table, the computer program product comprising computer-readable instructions for a method comprising:

receiving a request for data, the requested data being stored in the column of the database table;

determining a data type of the requested data stored in the column, the data type being of a first data type;

determining whether to display the first data type;

upon a determination to display the first data type, displaying the first data type;

upon a determination not to display the first data type, not displaying the first data type;

accessing the requested data in the first data type, wherein accessing the requested data in the first data type further comprises:

a) selecting an access method to access the requested data, the access method being able to access data of a particular data type, the access method being at least one of a plurality of access methods able to access data of a particular data type, and the access method being implemented in a data base driver, b) executing the access method to attempt access of the requested data, c) determining if the requested data is successfully accessed by the access method, d) upon a determination that the requested data is not successfully accessed by the access method, incrementing to a next access method in said plurality of access methods so that a different access method is selected, and repeating operations a, b, and c; and e) upon a determination that the requested data is successfully accessed by the access method, accessing the requested data;

determining whether to convert the requested data from the first data type to a second data type based upon a single user input of a selection of an option to convert the requested data from the first data type to a second data type;

upon a determination to convert the requested data from the first data type to the second data type, converting the requested data from the first data type to the second data type;

upon a determination not to convert the requested data from the first data type to the second data type, not converting the requested data; and outputting the requested data.

25. The computer program product of claim 24, wherein converting the requested data from the first data type to the second data type further comprises:

determining at least one second data type conversion option, the at least one second data type conversion option indicating a second data type into which the requested data of the first data type can be converted;

displaying the at least one second data type conversion option;

selecting a second data type conversion option, the selection of the second data type conversion option indicating selection of a second data type; and converting the requested data from the first data type to the selected second data type.

26. The computer program product of claim 24, wherein determining whether to display the first data type further comprises:

displaying a graphical user interface to a user, the graphical user interface including an option to request display of the first data type, whereupon selecting the option to request display of the first data type is a determination to display the first data type, and further whereupon; not selecting the option to request display of the first data type is a determination not to display the first data type.

27. The computer program product of claim 24, wherein determining whether to convert the requested data from a first data type to a second data type further comprises:

displaying a graphical user interface to a user, the graphical user interface including the option to convert the requested data from the first data type to a second data type, whereupon selecting the option to convert the requested data from the first data type to the second data type is a determination to convert the requested data from the first data type to the second data type, and further whereupon, not selecting the option to convert the requested data from the first data type to the second data type is a determination not to convert the requested data from the first data type to the second data type.

28. The computer program product of claim 27, wherein the graphical user interface further comprises:

a context menu.

29. A computer system comprising:

a processor; and a memory coupled to the processor, and having stored therein computer code for a method for accessing data in a column of a database table, wherein upon execution of the computer code on the processor, the method comprises:

receiving a request for data, the requested data being stored in the column of the database table;

determining a data type of the requested data stored in the column, the data type being of a first data type;

accessing the requested data in the first data type, wherein accessing the requested data in the first data type further comprises:

a) selecting an access method to access the requested data, the access method being able to access data of a particular data type, the access method being at least one of a plurality of access methods able to access data of a particular data type, and the access method being implemented in a data base driver,
b) executing the access method to attempt access of the requested data,
c) determining if the requested data is successfully accessed by the access method,
d) upon a determination that the requested data is not successfully accessed by the access method, incrementing to a next access method in said plurality of access methods so that a different access method is selected, and
repeating operations a, b, and c; and
e) upon a determination that the requested data is successfully accessed by the access method, accessing the requested data;
converting the requested data from the first data type to a second data type based upon a single user input of a selection of an option to convert the requested data from the first data type to the second data type; and
outputting the requested data.

30. The computer system of claim 29, the method further comprising:
displaying that first data type.

31. A computer system comprising:
a processor; and
a memory coupled to the processor, and having stored therein computer code for a method for accessing data in a column of a database table, wherein upon execution of the computer code on the processor, the method comprises:
receiving a request for data, the requested data being stored in the column of the database table;
determining a data type of the requested data stored in the column, the data type being of a first data type;
accessing the requested data in the first data type,
wherein accessing the requested data in the first data type further comprises:
a) selecting an access method to access the requested data, the access method being able to access data of a particular data type, the access method being at least one of a plurality of access methods able to access data of a particular data type, and the access method being implemented in a data base driver,
b) executing the access method to attempt access of the requested data,
c) determining it the requested data is successfully accessed by the access method,
d) upon a determination that the requested data is not successfully accessed by the access method, incrementing to a next access method in said plurality of access methods so that a different access method is selected, and
repeating operations a, b, and c; and
e) upon a determination that the requested data is successfully accessed by the access method, accessing the requested data;
determining whether to convert the requested data from the first data type to a second data type based upon a single user input of a selection of an option to convert the requested data from the first data type to a second data type;
upon a determination to convert the requested data from the first data type to the second data type,
converting the requested data from the first data type to the second data type; and
outputting the requested data.

32. A computer system comprising:
a processor; and
a memory coupled to the processor, and having stored therein computer code for a method for accessing data in a column of a database table, wherein upon execution of the computer code on the processor, the method comprises:
receiving a request for data in a requested data type, the requested data being stored in the column of the database table;
determining a data type of the requested data stored in the column, the data type being of a column data type;
accessing the requested data in the column data type,
wherein accessing the requested data in the column data type further comprises:
a) selecting an access method to access the requested data, the access method being able to access data of a particular data type, the access method being at least one of a plurality of access methods able to access data of a particular data type, and the access method being implemented in a data base driver,
b) executing the access method to attempt access of the requested data,
c) determining if the requested data is successfully accessed by the access method,
d) upon a determination that the requested data is not successfully accessed by the access method, incrementing to a next access method in said plurality of access methods so that a different access method is selected, and
repeating operations a, b, and c; and
e) upon a determination that the requested data is successfully accessed by the access method, accessing the requested data;
determining it the column data type is the same as the requested data type;
upon a determination that the column data type is the same as the requested data type, outputting the requested data; and
upon a determination that the column data type is not the same as the requested data type, converting the requested data from the column data type to the requested data type, and outputting the requested data.

33. The computer system of claim 32, wherein in the method, the request for data is input from at least one of a user, a program application, and a component of a program application.

34. A computer system comprising:
a processor; and
a memory coupled to the processor, and having stored therein computer code for a method for accessing data in a column of a database table, wherein upon execution of the computer code on the processor, the method comprises:
receiving a request for data, the requested data being stored in the column of the database table;
determining a data type of the requested data stored in the column, the data type being of a first data type;
determining whether to display the first data type;
upon a determination to display the first data type, displaying the first data type;

upon a determination not to display the first data type, not displaying the first data type;
accessing the requested data in the first data type,
wherein accessing the requested data in the first data type further comprises:
 a) selecting an access method to access the requested data, the access method being able to access data of a particular data type, the access method being at least one of a plurality of access methods able to access data of a particular data type, and the access method being implemented in a data base driver,
 b) executing the access method to attempt access of the requested data,
 c) determining if the requested data is successfully accessed by the access method,
 d) upon a determination that the requested data is not successfully accessed by the access method, incrementing to a next access method in said plurality of access methods so that a different access method is selected, and
repeating operations a, b, and c; and
 e) upon a determination that the requested data is successfully accessed by the access method, accessing the requested data;
determining whether to convert the requested data from the first data type to a second data type based upon a single user input of a selection of an option to convert the requested data from the first data type to a second data type;
upon a determination to convert the requested data from the first data type to the second data type, converting the requested data from the first data type to the second data type;
upon a determination not to convert the requested data from the first data type to the second data type, not converting the requested data; and
outputting the requested data.

35. The computer system of claim 34, wherein in the method, converting the requested data from the first data type to the second data type further comprises:
determining at least one second data type conversion option, the at least one second data type conversion option indicating a second data type into which the requested data of the first data type can be converted;
displaying the at least one second data type conversion option;
selecting a second data type conversion option, the selection of the second data type conversion option indicating selection of a second data type; and
converting the requested data from the first data type to the selected second data type.

* * * * *

UNITED STATES PATENT AND TRADEMARK OFFICE
CERTIFICATE OF CORRECTION

| | | |
|---|---|---|
| PATENT NO. | : 7,149,745 B2 | Page 1 of 1 |
| APPLICATION NO. | : 10/135231 | |
| DATED | : December 12, 2006 | |
| INVENTOR(S) | : Janssen | |

It is certified that error appears in the above-identified patent and that said Letters Patent is hereby corrected as shown below:

Column 16
In Claim 12, at line 66, after "first data type is", insert --a--.

Column 17
In Claim 15, at line 30, after "selecting an access", replace "methods" with --method--.

Column 20
In Claim 26, at line 32, after "further whereupon", replace ";" with --,--.

Column 21
In Claim 30, at line 25, after "displaying", replace "that" with --the--.
In Claim 31, at line 48, after "determining", replace "it" with --if--.

Signed and Sealed this

Sixth Day of March, 2007

JON W. DUDAS
*Director of the United States Patent and Trademark Office*